United States Patent
Wang

(10) Patent No.: US 11,826,917 B2
(45) Date of Patent: *Nov. 28, 2023

(54) OBJECT DETERMINING SYSTEM AND AUTO CLEAN MACHINE USING THE OBJECT DETERMINING SYSTEM

(71) Applicant: PixArt Imaging Inc., Hsin-Chu (TW)

(72) Inventor: Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,370

(22) Filed: Dec. 6, 2022

(65) Prior Publication Data

US 2023/0109201 A1 Apr. 6, 2023

Related U.S. Application Data

(63) Continuation of application No. 16/653,982, filed on Oct. 15, 2019, now Pat. No. 11,548,157.

(51) Int. Cl.

| G05B 19/04 | (2006.01) |
| G05B 19/18 | (2006.01) |
| B25J 9/16 | (2006.01) |
| G05D 1/02 | (2020.01) |

(52) U.S. Cl.
CPC .......... *B25J 9/1694* (2013.01); *G05D 1/0253* (2013.01); *G05B 2219/45098* (2013.01); *G05D 2201/0203* (2013.01)

(58) Field of Classification Search
CPC ................. B25J 9/1694; G05D 1/0253; G05D 2201/0203; G05B 2219/45098
See application file for complete search history.

(56) References Cited

U.S. PATENT DOCUMENTS

| 2019/0239709 A1* | 8/2019 | Thomas | ................ A47L 9/2847 |
| 2019/0277739 A1* | 9/2019 | Aoto | ...................... G01N 11/00 |
| 2020/0166429 A1* | 5/2020 | Egedal | ..................... F03D 17/00 |

FOREIGN PATENT DOCUMENTS

| CN | 1846591 A | 10/2006 | |
| CN | 204523536 U | 8/2015 | |
| CN | 106200645 A | 12/2016 | |
| CN | 106475327 A | 3/2017 | |
| JP | 2001-171850 A | 6/2001 | |
| JP | 2005-121614 A | 5/2005 | |
| JP | 2005121614 A * | 5/2005 | |
| WO | 2014/090901 A1 | 6/2014 | |
| WO | WO-2014090901 A1 * | 6/2014 | ........... A47L 9/2852 |

* cited by examiner

*Primary Examiner* — Harry Y Oh
(74) *Attorney, Agent, or Firm* — Winston Hsu

(57) ABSTRACT

One object determining system comprising: an air ejection device, configured to eject air; a distance detecting circuit, configured to detect distances between an electronic device comprising the object determining system and at least one location of an object when the air ejection device ejects air to the object; and a determining circuit, configured to determine a type of the object according to variations of the distances.

7 Claims, 7 Drawing Sheets

OBJECT DETERMINING SYSTEM AND AUTO CLEAN MACHINE USING THE OBJECT DETERMINING SYSTEM

CROSS REFERENCE TO RELATED APPLICATIONS

This application is a continuation application of U.S. application Ser. No. 16/653,982, filed on Oct. 15, 2019. The content of the application is incorporated herein by reference.

BACKGROUND OF THE INVENTION

1. Field of the Invention

The present invention relates to an object determining system and an auto clean machine using the object determining system, and particularly relates to an object determining system and an auto clean machine using the object determining system which can determine a type of the object.

2. Description of the Prior Art

Conventionally, an auto clean machine may use some methods to determine if an object exists in front of the auto clean machine, such as optical, lidar (Light Detection And Ranging) or ultrasound. However, such method cannot determine whether the object is a rigidity type object or a soft type object, thus the auto clean machine may pass by the object even if the object can be passed (e.g. a curtain).

Besides, an auto clean machine may use collision to determine whether an object in front of the auto clean machine is a rigidity type object or a soft type object. However, such method may have some problems. For example, if a user uses a light stuff to block a path of the auto clean machine, the auto clean machine may knock the object away and keeps moving. Besides, some fragile items such as a glass cup may be broken due to the collision.

SUMMARY OF THE INVENTION

One objective of the present invention is to provide an object determining system comprising: an air ejection device, configured to eject air; a distance detecting circuit, configured to detect distances between an electronic device comprising the object determining system and at least one location of an object when the air ejection device ejects air to the object; and a determining circuit, configured to determine a type of the object according to variations of the distances.

Another embodiment of the present invention discloses an auto clean machine comprising an object determining system and a control circuit. The object determining system, comprises: an air ejection device, configured to eject air to an object; a distance detecting circuit, configured to detect distances between the auto clean machine and different locations of an object when the air ejection device ejects air to the object; and a determining circuit, configured to determine a type of the object according to variations of the distances. The control circuit is configured to control the auto clean machine according to the type.

Still another embodiment discloses an object determining method, comprising: (a) ejecting air to an object; (b) detecting distances between an electronic device and at least one location of an object when the air ejection device ejects air to the object; and determining whether the object is a rigidity type object or a soft type object according to the variations.

In view of above-mentioned embodiments, the type of an object can be determined without colliding the object, thus the object will not be damaged due to the collision. Besides, the object can still be passed through when it is a soft type object, thus the conventional issue can be avoided.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note, the components in each embodiment can be implemented by hardware (e.g. a circuit or a device) or by firmware (e.g. a processor with at least one program). Additionally, the terms "first", "second" . . . in each embodiment are only for defining different steps or components, but do not mean to limit sequences thereof. Additionally, each of the components in following embodiments can be integrated to fewer components or be divided into more components.

Figure 1:
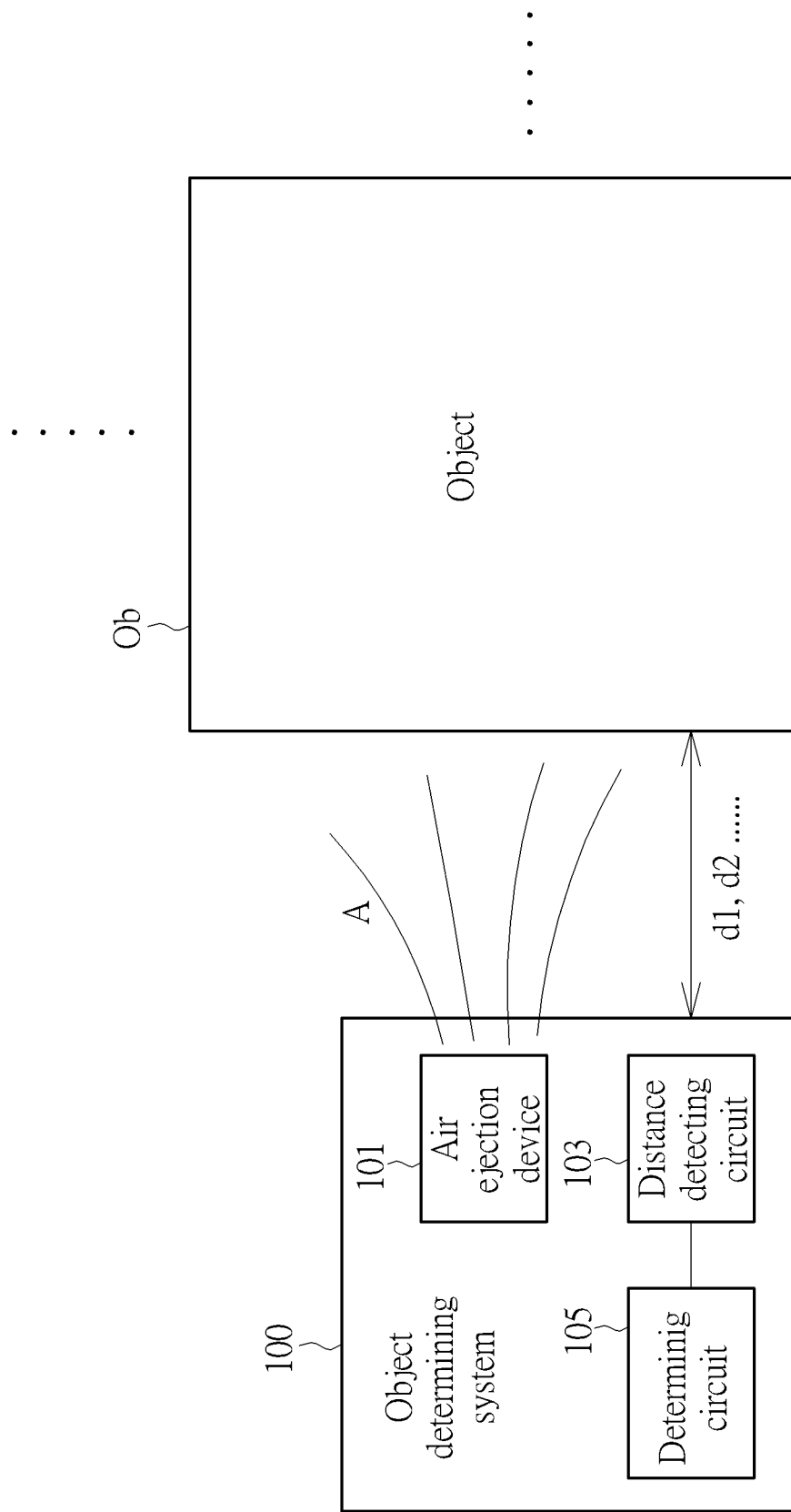
FIG. 1 is a block diagram illustrating an object determining system according to one embodiment of the present invention.

FIG. 1 is a block diagram illustrating an object determining system according to one embodiment of the present invention. Please note, a relation between the sizes of the object determining system 100 and the object Ob are only for examples and do not mean to limit the scope of the present invention. As illustrated in FIG. 1, the object determining system 100 comprises an air ejection device 101, a distance detecting circuit 103 and a determining circuit 105. The air ejection device 101 is configured to eject air A. The distance detecting circuit 103 is configured to detect distances d1, d2 . . . between an electronic device (not illustrated here) comprising the object determining system 100 and different locations of an object Ob when the air ejection device 101 ejects air A to the object Ob. The distance detecting circuit 103, can be, for example, a distance measurer using laser. The determining circuit 105 is configured to determine a type of the object Ob according to variations of the distances d1, d2.

In one embodiment, the determining circuit 105 determines whether the object Ob is a rigidity type object or a soft type object according to variations of the distances d1, d2. However, the types which can be determined according to variations of the distances d1, d2 . . . are not limited to the rigidity type object and the soft type object. For example, the determining circuit 105 can determine whether the object has a soft surface or not according to variations of the distances d1, d2 . . . .

Figure 2:
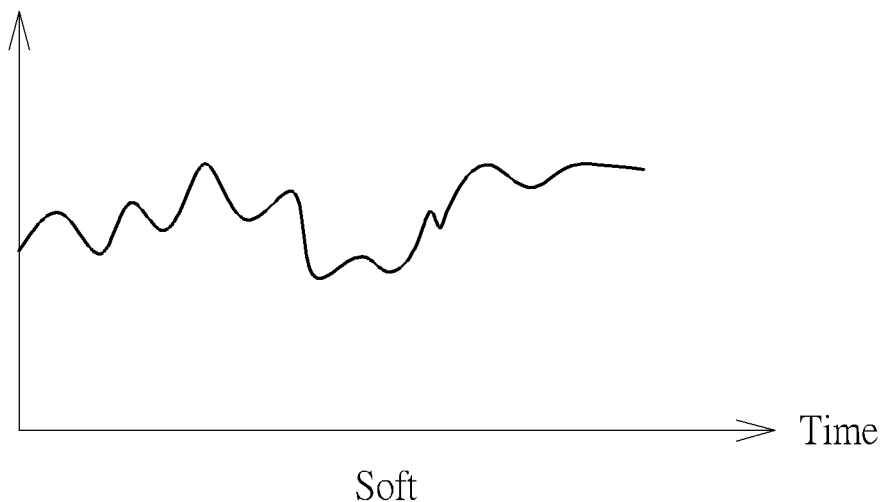
FIG. 2 is a schematic diagram illustrating distance variations of the distances detected by the object determining system illustrated in FIG. 1.
Figure 2:
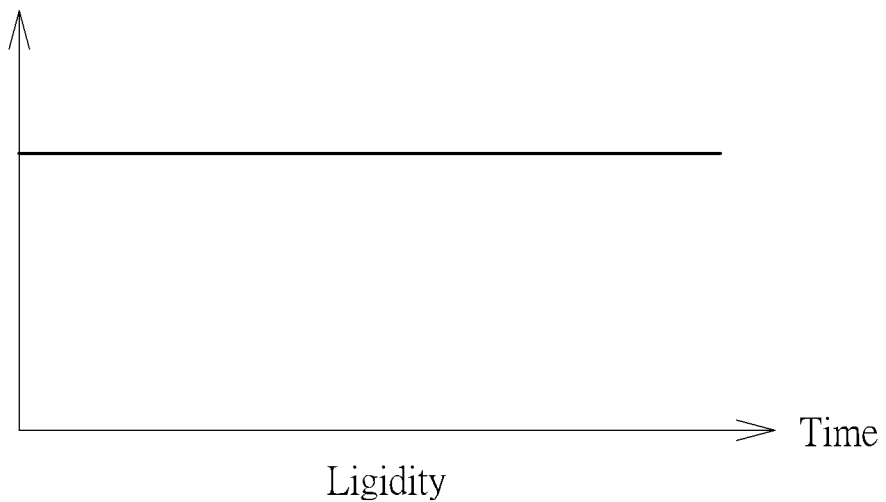

FIG. 2 is a schematic diagram illustrating distance variations detected by the object determining system illustrated in FIG. 1. As illustrated in FIG. 2, if the object Ob is a soft type object, such as a curtain, a sheet or a furniture cover, the distances d1, d2 . . . may have variations when the air ejection device 101 ejects air A to the object B, since the shape of the object Ob has deformation due to the air A. On the contrary, if the object Ob is a rigidity type object, such as a part of a furniture, a cup or a box, the distances d1, d2 . . . may be the same when the air ejection device 101 ejects air A to the object B, since the shape of the object Ob has no deformation or only little deformation when the air A is ejected to the object Ob. Briefly, a soft type object means an object has deformation when the air A is ejected thereto, and a rigid type object means an object has no deformation or only little deformation hen the air.

Many methods can be applied to determine whether the object Ob is the rigidity type object or the soft type object according to the variations of distances d1, d2 . . . . Several embodiments are provided in following descriptions to explain examples of such methods. It will be appreciated that only the distance detecting circuit 103 is illustrated in followings embodiments, for the convenience of explaining.

Figure 3:
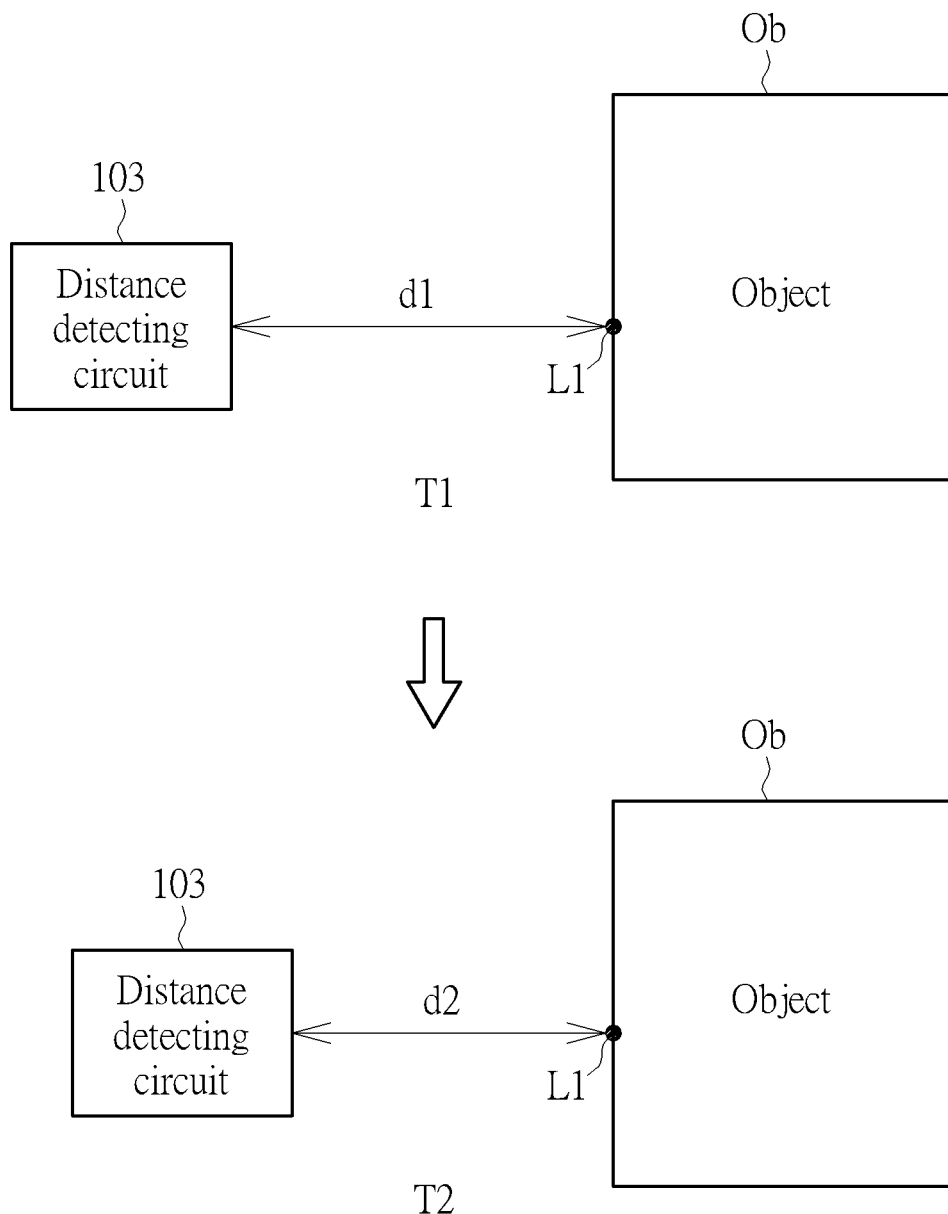
FIG. 3 is a block diagram illustrating one example for determining whether the object is a rigidity type object or a soft type object according to one embodiment of the present invention.

FIG. 3 is a block diagram illustrating one example for determining whether the object is a rigidity type object or a soft type object according to one embodiment of the present invention. As illustrated in FIG. 3, the distance detecting circuit 103 detects a first distance d1 between the electronic device comprising the distance detecting circuit 103 and a first location L1 of the object at a first time point T1. Also, the distance detecting circuit 103 detects a second distance d2 between the electronic device comprising the distance detecting circuit 103 and the first location L1 at a second time point T2 after the first time point T1. The determining circuit 105 determines whether the object Ob is the rigidity type object or the soft type object according to the first distance d1 and the second distance d2. Please note, in following embodiments, the electronic device comprising the distance detecting circuit 103 means an auto clean machine, but can mean the object determining system 100 itself.

For example, in one embodiment, the determining circuit 105 determines the object Ob is the rigidity type object when a difference between the first distance d1 and the second distance d2 is smaller than a distance threshold, and determines the object Ob is the soft type object when the difference is larger than the distance threshold. If the object Ob is the rigidity type object, the difference should be very small or zero since the object Ob may have only little deformation or no deformation when the air A is ejected to the object. On the opposite, if the object Ob is the soft type object, the difference should be larger since the object Ob may have large deformation when the air A is ejected to the object.

Figure 4:
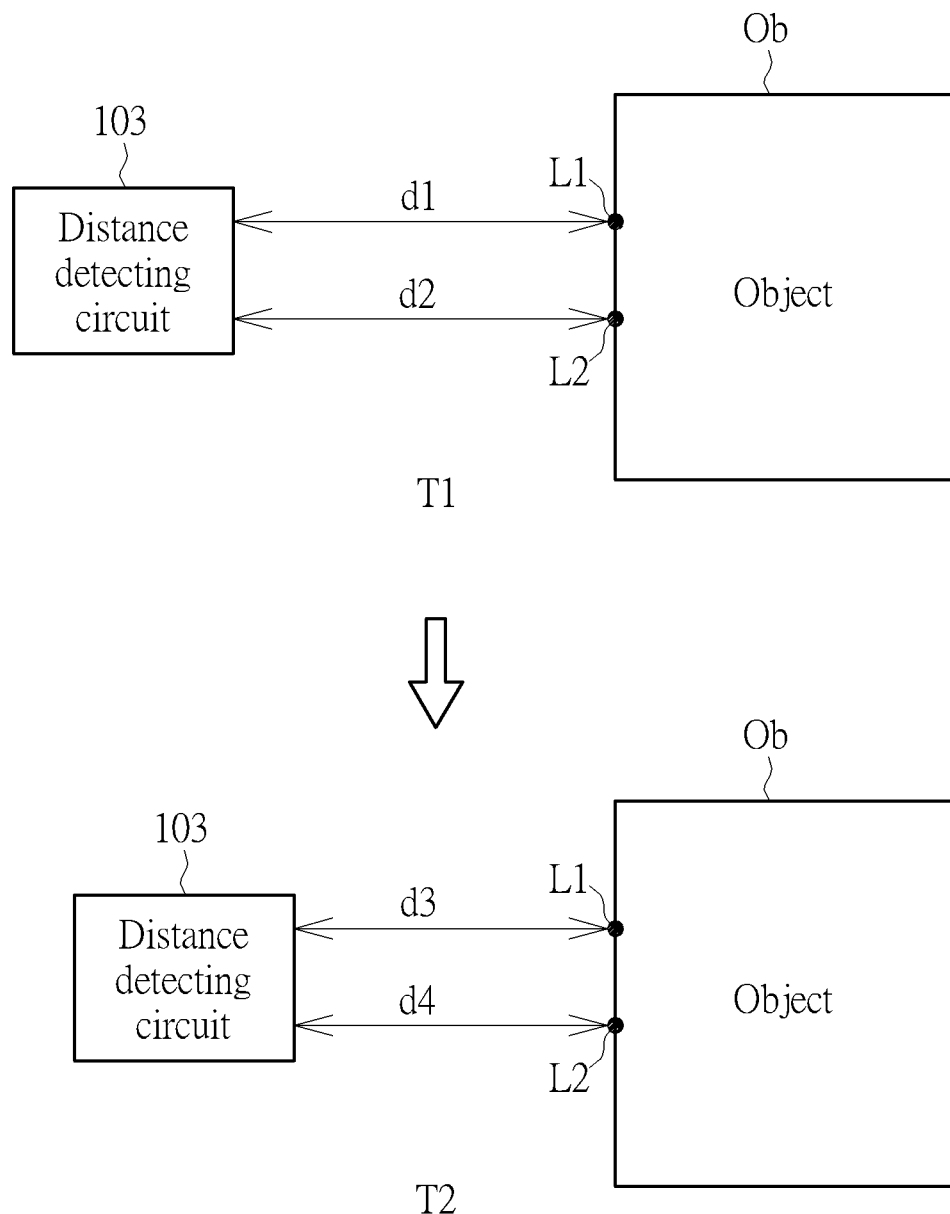
FIG. 4 is a block diagram illustrating another example for determining whether the object is a rigidity type object or a soft type object according to another embodiment of the present invention.

FIG. 4 is a block diagram illustrating one example for determining whether the object is a rigidity type object or a soft type object according to another embodiment of the present invention. As illustrated in FIG. 4, the distance detecting circuit 103 detects a first distance d1 between the electronic device comprising the distance detecting circuit 103 and a first location L1 of the object Ob and detects a second distance d2 between the electronic device comprising the distance detecting circuit 103 and a second location L2 of the object Ob at a first time point T1. Also, the distance detecting circuit 103 detects a third distance d3 between the electronic device comprising the distance detecting circuit 103 and the first location L1 and detects a fourth distance d4 between the electronic device comprising the distance detecting circuit 103 and the second location L2 at a second time point T2 after the first time point T1. After that, the determining circuit 105 determines whether the object is the rigidity type object or the soft type object according to the first distance d1, the second distance d2, the third distance d3 and the fourth distance d4.

In one embodiment, the determining circuit 105 determines the object is the rigidity type object when a difference between a ratio of the first distance d1 and the second distance d2 and a ratio of the third distance d3 and the fourth distance d4 is smaller than a ratio threshold. The determining circuit 105 determines the object is the soft type object when the difference is larger than the ratio threshold. If the object Ob is the rigidity type object, the difference between two ratios should be very small or zero since the object Ob may have only little deformation or no deformation when the air A is ejected to the object. On the opposite, if the object Ob is the soft type object, the difference between two ratios should be larger since the object Ob may have large deformation when the air A is ejected to the object.

Please note, the embodiments illustrated in FIG. 3 and FIG. 4 are only examples for determining the type of the object Ob, and do not mean to limit the scope of the present invention. Any method can represent the distance variations which are used for determining the type of the object Ob should fall in the scope of the present invention.

Figure 5:
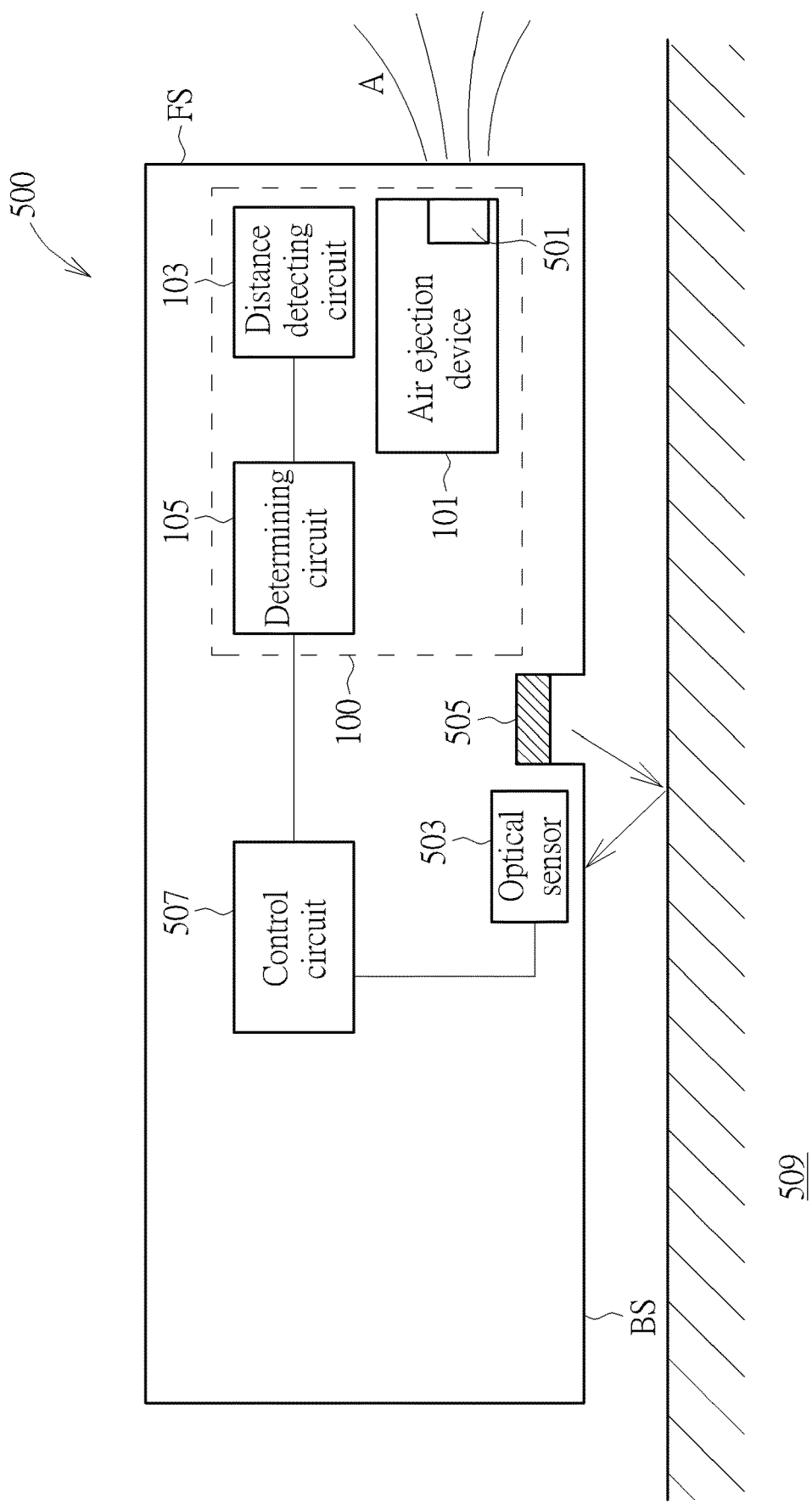
FIG. 5 is a block diagram illustrating an auto clean machine comprising the object determining system according to one embodiment of the present invention.

In one embodiment, the object determining system 100 is comprised in an auto clean machine (or named a robot vacuum cleaner) such as a cleaning robot. FIG. 5 is a block diagram illustrating an auto clean machine 500 comprising the object determining system 100 according to one embodiment of the present invention. As illustrated in FIG. 5, the auto clean machine 500 comprises the object determining system 100, which comprises the air ejection device 101, the distance detecting circuit 103 and the determining circuit 105. In one embodiment, the air ejection device 101 further comprises an air outlet 501 to eject the air A, and the air outlet 501 is provided at a front surface FS of the auto clean machine 500.

The auto clean machine 500 further comprises an optical sensor 503, a light source 505 and a control circuit 507. The control circuit 507 (e.g. a processor) is configured to control the auto clean machine 500 according to the type of the object Ob. The light source 505 is configured to emit light to a ground 509 through a bottom surface BS perpendicular with the front surface FS of the auto clean machine 500. The optical sensor 503 is configured to sense optical data (e.g. image) generated according to reflected light of light from the light source 505. The control circuit 507 further calculates a location of the auto clean machine 500 according to the optical data. Please note, the above-mentioned determining circuit 105 can be integrated to the control circuit 507.

Figure 6:
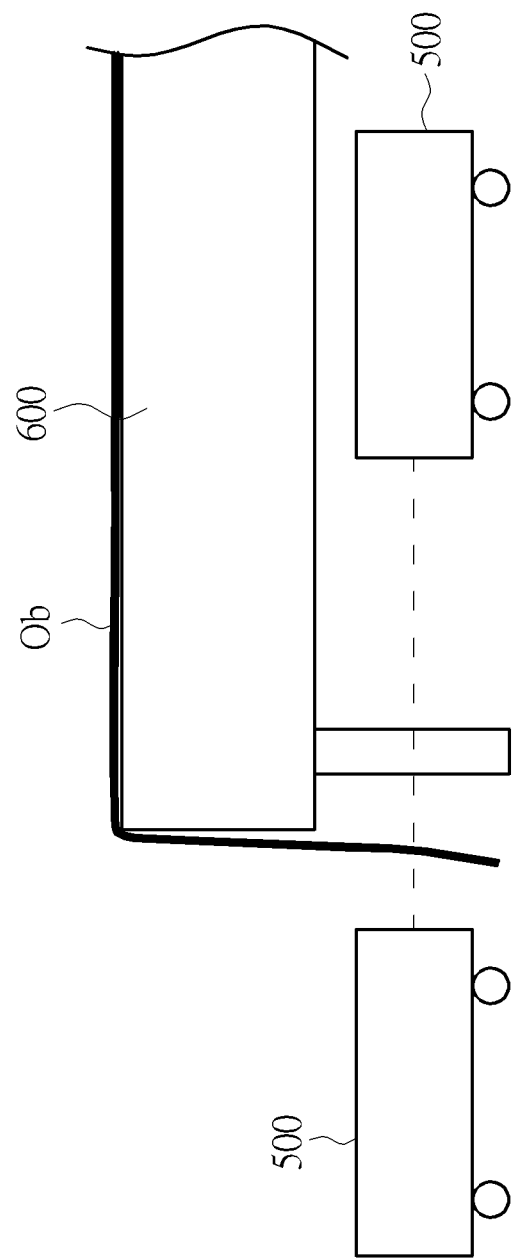
FIG. 6 and FIG. 7 are schematic diagrams illustrating operations of the auto clean machine illustrated in FIG. 5, according to different embodiments of the present invention.

As above-mentioned, the control circuit 507 is configured to control the auto clean machine 500 according to the type of the object Ob. In one embodiment, the control circuit 507 controls the auto clean machine 500 to pass through the object Ob when the object Ob is determined as the soft type object. FIG. 6 is a schematic diagram illustrating operations of the auto clean machine 500 illustrated in FIG. 5, according to an embodiment of the present invention. As illustrated in FIG. 6, the object Ob is a sheet covering the bed 600 and is determined as a soft type object. Accordingly, the control circuit 507 will control the auto clean machine 500 to pass through the object Ob rather than passes by it when the object Ob is determined as the soft type object. By this way, the region under the bed 600 can be cleaned. If the auto clean machine 500 uses the conventional methods to detect the object, the auto clean machine 500 will not enter the region under the bed 600 thus the region under the bed 600 will not be cleaned.

Figure 7:
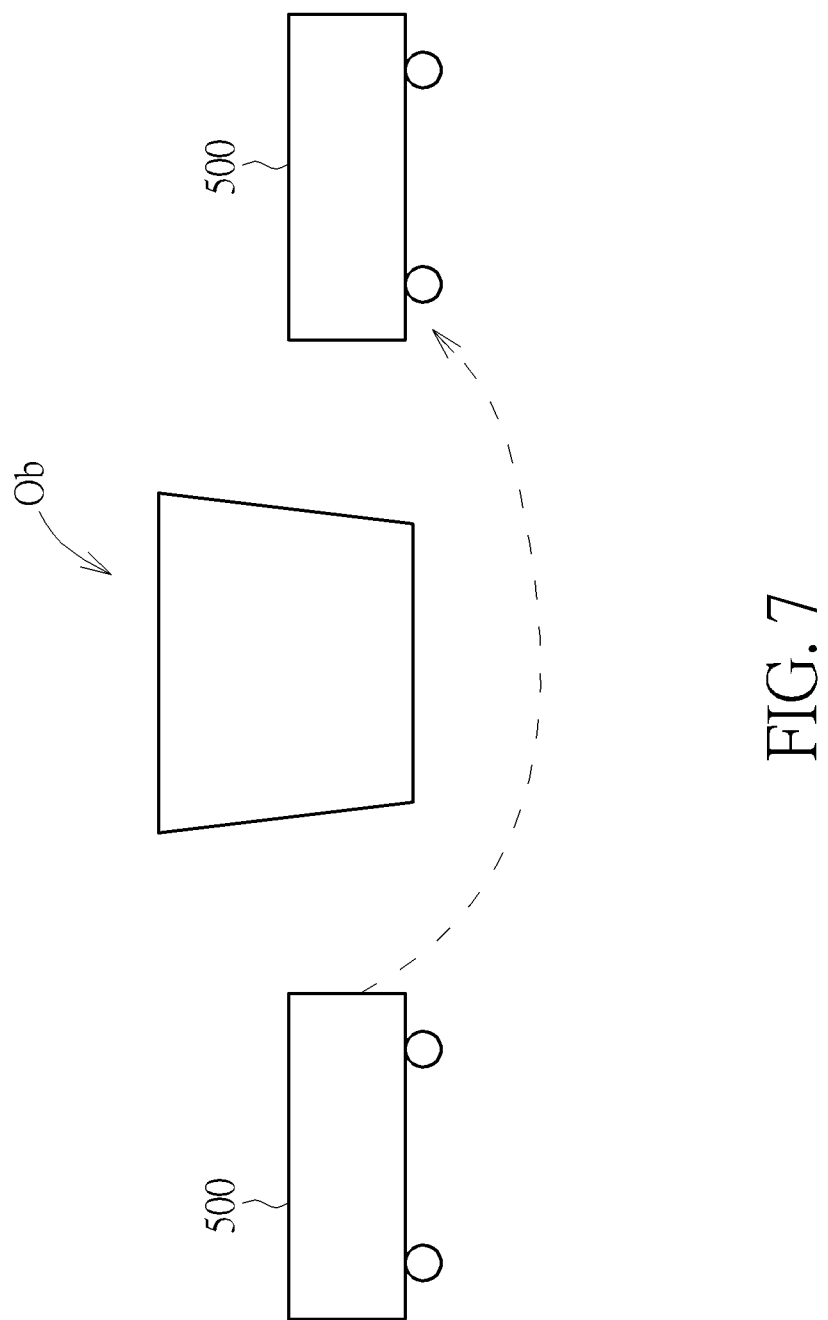

In the embodiment of FIG. 7, the object Ob is a vase which will be determined as the rigidity type object. In such case, the control circuit 507 controls the auto clean machine 500 to bypass the object Ob. By this way, the object Ob is not collided thus will not be damaged.

Based upon above-mentioned embodiments, an object determining method can be acquired, which comprises the steps of: detecting distances (e.g. d1, d2 in FIG. 1) between an electronic device and at least one location of an object (e.g. Ob in FIG. 1) when air is ejected to the object; and determining a type of the object according to variations of the distances. Other details are illustrated in above-mentioned embodiments, thus are omitted for brevity here.

In view of above-mentioned embodiments, the type of an object can be determined without colliding the object, thus the object will not be damaged due to the collision. Besides, the object can still be passed through when it is a soft type object, thus the conventional issue can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto clean machine, comprising:
    an object determining system, comprising:
        an air ejection device, configured to eject air to an object;
        a distance detecting circuit, configured to detect distances between the auto clean machine and different locations of an object when the air ejection device ejects air to the object; and
        a determining circuit, configured to determine a type of the object according to variations of the distances; and
    a control circuit, configured to control the auto clean machine according to the type;
    wherein the auto clean machine further comprises:
    a light source, configured to emit light to a ground on which the auto clean machine is located; and
    an optical sensor, configured to sense optical data according to reflected light from the ground, wherein the control circuit calculates a location of the auto clean machine according to the optical data;
    wherein the air ejection device comprises an air outlet configured to eject the air, wherein the air outlet is provided at a surface of the auto clean machine and the surface is perpendicular with a bottom surface of the auto clean machine.

2. The auto clean machine of claim 1, wherein the determining circuit determines whether the object is a rigidity type object or a soft type object according to the variations.

3. The auto clean machine of claim 2, wherein the control circuit controls the auto clean machine to pass through the object when the object is determined as the soft type object.

4. The auto clean machine of claim 2, wherein the control circuit controls the auto clean machine to bypass the object when the object is determined as the rigidity type object.

5. The auto clean machine of claim 2,
    wherein the determining circuit detects a first distance between the auto clean machine and a first location of the object at a first time point and detects a second distance between the auto clean machine and the first location at a second time point after the first time point;
    wherein the determining circuit determines whether the object is the rigidity type object or the soft type object according to variations between the first distance and the second distance.

6. The auto clean machine of claim 5,
    wherein the determining circuit determines the object is the rigidity type object when a difference between the first distance and the second distance is smaller than a distance threshold, and determines the object is the soft type object when the difference is larger than the distance threshold.

7. The auto clean machine of claim 2,
    wherein the determining circuit detects a first distance between the auto clean machine and a first location of the object and detects a second distance between the auto clean machine and a second location of the object at a first time point;
    wherein the determining circuit detects a third distance between the auto clean machine and the first location and detects a fourth distance between the auto clean machine and the second location at a second time point after the first time point;
    wherein the control circuit determines whether the object is the rigidity type object or the soft type object according to the first distance, the second distance, the third distance and the fourth distance.

* * * * *